(12) United States Patent
Deshpande et al.

(10) Patent No.: US 8,665,818 B2
(45) Date of Patent: Mar. 4, 2014

(54) METHOD AND SYSTEM FOR DYNAMIC ANCHORING OF CIRCUIT-SWITCHED CALLS

(75) Inventors: Manoj M Deshpande, San Diego, CA (US); Kirti Gupta, San Diego, CA (US); Ranjith Jayaram, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1830 days.

(21) Appl. No.: 11/445,978

(22) Filed: Jun. 2, 2006

(65) Prior Publication Data
US 2007/0280162 A1 Dec. 6, 2007

(51) Int. Cl.
*H04L 12/66* (2006.01)
*H04W 36/00* (2009.01)
*H04W 4/00* (2009.01)

(52) U.S. Cl.
CPC ................................ *H04W 35/005* (2013.01)
USPC ........... 370/331; 370/352; 455/436; 455/437; 455/438; 455/439; 455/440

(58) Field of Classification Search
USPC ......... 370/465, 310–328, 331, 338, 352–356; 455/436–442
See application file for complete search history.

(56) References Cited

U.S. PATENT DOCUMENTS

| | | | | |
|---|---|---|---|---|
| 6,125,276 | A * | 9/2000 | Lupien | 455/436 |
| 7,535,889 | B2 * | 5/2009 | Ejzak et al. | 370/352 |
| 7,646,777 | B2 * | 1/2010 | Hicks et al. | 370/401 |
| 7,843,937 | B2 * | 11/2010 | Song et al. | 370/395.2 |
| 8,116,769 | B2 * | 2/2012 | Donovan et al. | 455/436 |
| 8,180,338 | B1 * | 5/2012 | Sylvain | 455/422.1 |
| 8,204,041 | B2 * | 6/2012 | Britsch | 370/352 |
| 8,208,442 | B2 * | 6/2012 | Mahdi et al. | 370/331 |
| 8,340,627 | B2 * | 12/2012 | Edge | 455/404.1 |
| 2002/0075850 | A1 * | 6/2002 | Cruz et al. | 370/352 |
| 2002/0101841 | A1 * | 8/2002 | Kilgore | 370/331 |
| 2003/0104815 | A1 * | 6/2003 | Lee | 455/436 |
| 2006/0002381 | A1 * | 1/2006 | Socaciu | 370/352 |
| 2006/0251113 | A1 * | 11/2006 | Jagadeesan et al. | 370/465 |
| 2006/0258358 | A1 * | 11/2006 | Kallio | 455/437 |
| 2006/0286984 | A1 * | 12/2006 | Bonner | 455/445 |
| 2006/0291419 | A1 * | 12/2006 | McConnell et al. | 370/331 |
| 2007/0014281 | A1 * | 1/2007 | Kant | 370/352 |
| 2007/0047516 | A1 * | 3/2007 | Kottilingal | 370/352 |
| 2007/0149166 | A1 * | 6/2007 | Turcotte et al. | 455/404.1 |
| 2007/0217354 | A1 * | 9/2007 | Buckley | 370/328 |

(Continued)

FOREIGN PATENT DOCUMENTS

IT EP0932318 A2 * 7/1999

OTHER PUBLICATIONS

3GPP TR 23.806 v7.0.0; "Voice Call Continuity between CS and IMS Study"; GSM Global sysem for mobile communications; Dec. 2005.*

*Primary Examiner* — Asad Nawaz
*Assistant Examiner* — Wutchung Chu
(74) *Attorney, Agent, or Firm* — Abdollah Katbab

(57) ABSTRACT

The disclosure is directed to a mobile communication device that is capable of accessing different types of networks such as a circuit-switched network and a packet-switched network. Anchoring of a circuit-switched initiated session is useful when the session is transferred to a packet-switched network. Accordingly, a dynamic anchoring technique is used that relies on the mobile device to determine when, during on ongoing session, a handoff condition exists. The mobile device then sends a trigger signal that initiates the anchoring process.

34 Claims, 6 Drawing Sheets

(56) References Cited

U.S. PATENT DOCUMENTS

| | | | |
|---|---|---|---|
| 2007/0217366 A1* | 9/2007 | Sagi et al. | 370/331 |
| 2007/0248079 A1* | 10/2007 | Jayaram et al. | 370/352 |
| 2007/0254625 A1* | 11/2007 | Edge | 455/404.1 |
| 2008/0032695 A1* | 2/2008 | Zhu et al. | 455/442 |
| 2009/0086674 A1* | 4/2009 | Ejzak | 370/331 |
| 2010/0034166 A1* | 2/2010 | Olvera-Hernandez | 370/331 |

* cited by examiner

METHOD AND SYSTEM FOR DYNAMIC ANCHORING OF CIRCUIT-SWITCHED CALLS

BACKGROUND

1. Field

The present disclosure relates generally to telecommunications, and more particularly, to systems and methods to support a mobile communications device capable of communicating via two different types of communication networks.

2. Background

The demand for wireless information services has led to the development of an ever increasing number of wireless networks. CDMA2000 1× is just one example of a wireless network that provides wide area telephony and data services. CDMA2000 1× is a wireless standard promulgated by the Third Generation Partnership Project 2 (3GPP2) using code division multiple access (CDMA) technology. CDMA is a technology that allows multiple users to share a common communications medium using spread-spectrum processing. A competing wireless network that is commonly employed in Europe is Global System for Mobile Communications (GSM). Unlike CDMA2000 1×, GSM uses narrowband time division multiple access (TDMA) to support wireless telephony and data services. Some other wireless networks include General Packet Radio Service (GPRS) which supports high speed data services with data rates suitable for e-mail and web browsing applications, and Universal Mobile Telecommunications System (UMTS) which can deliver broadband voice and data for audio and video applications. Other access technologies include EV-DO and High-Speed Downlink Packet Access (HSDPA).

These wireless networks can generally be thought of as wide area networks employing cellular technology. Cellular technology is based on a topology in which the geographic coverage region is broken up into cells. Within each of these cells is a fixed base transceiver station (BTS) that communicates with mobile users. A base station controller (BSC) is typically employed in the geographic coverage region to control the BTSs and route communications to the appropriate gateways for the various packet-switched and circuit-switched networks.

As the demand for wireless information services continue to increase, mobile devices are evolving to support integrated voice, data, and streaming media while providing seamless network coverage between wide area circuit switched cellular networks, wide area packet switched cellular networks and wireless local area networks (LAN). Wireless LANs generally provide telephony and data services over relatively small geographic regions using a standard protocol, such as IEEE 802.11, or the like. The existence of wireless LANs provides a unique opportunity to increase user capacity in a wide area cellular network by extending cellular communications to the unlicensed spectrum using the infrastructure of the wireless LAN.

Recently, various techniques have been employed to enable mobile devices to communicate with different wireless networks such as packet-switched networks and circuit-switched networks. Accordingly, there are now instances in which a session initiated by a mobile device over a circuit-switched network may be handed-off to a packet-switched network. There exists the need, therefore, to accomplish such handoffs in a manner that efficiently utilizes the resources of the networks. More over, it is beneficial that any method to accomplish efficient handoff does not introduce any changes to the legacy PSTN networks and cellular circuit switched networks.

SUMMARY

One aspect of a mobile device relates to a method for providing call continuity in a mobile communications device capable of communicating over multiple access networks. In accordance with this method, whether or not a handoff condition to a packet-switched network exists is determined during an active circuit-switched session and in response, a signal related to anchoring the session is sent to a server configured to anchor the circuit-switched session, in order to perform handoff to the packet switched session if/when required.

Another aspect of a mobile device relates to a mobile communications device capable of communicating over multiple access networks. This device includes a transceiver circuit capable of exchanging data from multiple access networks and a processor configured to execute instructions. Upon execution of the instructions, the processor is able to determine, during an active circuit-switched session, whether or not a handoff condition to a packet-switched network exists; and in response, send a signal related to anchoring to a server configured to anchor the circuit-switched session, in order to perform handoff to the packet switched session.

It is understood that other embodiments of the present invention will become readily apparent to those skilled in the art from the following detailed description, wherein it is shown and described only various embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Various aspects of a wireless communications system are illustrated by way of example, and not by way of limitation, in the accompanying drawings, wherein.

DETAILED DESCRIPTION

The detailed description set forth below in connection with the appended drawings is intended as a description of various embodiments of the invention and is not intended to represent the only embodiments in which the invention may be practiced. The detailed description includes specific details for the purpose of providing a thorough understanding of the invention. However, it will be apparent to those skilled in the art that the invention may be practiced without these specific details. In some instances, well known structures and components are shown in block diagram form in order to avoid obscuring the concepts of the invention.

In the following detailed description, various techniques will be described in connection with the handoff of a mobile user from one network to another. A number of these techniques will be described in the context of a mobile communications device traveling through a circuit switched cellular network with one or more packet switched cellular network and/or wireless LANs dispersed throughout the cellular coverage region. The mobile communications device may be any suitable device capable of wireless telephony or data communications, such as a cellular phone designed for operation in a CDMA2000 1x network. The mobile communications device may be capable of employing any suitable protocol for accessing a wireless LAN, including, by way of example, IEEE 802.11. While these techniques may be described in the context of a cellular phone capable of communicating with an IEEE 802.11 network, those skilled in the art will readily appreciate that these techniques can be extended to other mobile communication devices capable of accessing multiple networks. For instance, these techniques may be applied to a mobile communications device capable of switching within or between a CDMA2000 network and a GSM/UMTS network. Accordingly, any reference to a cellular phone capable of communicating with an IEEE 802.11 network, or any other specific embodiment, is intended only to illustrate various aspects of the present invention, with the understanding that these aspects have a wide range of applications.

Figure 1A:
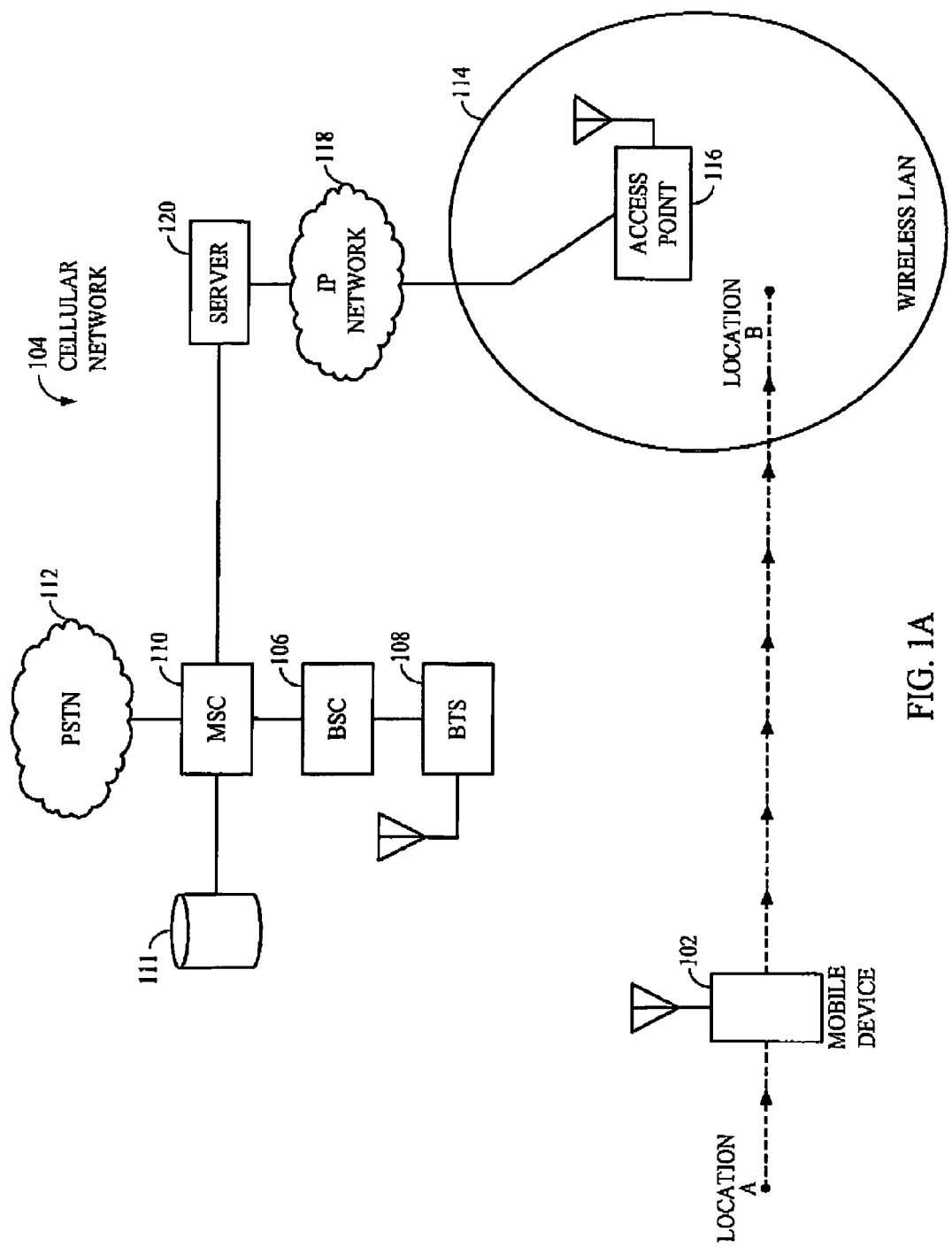
FIG. 1A is a conceptual block diagram of an embodiment of a wireless communications system.

FIG. 1A is a conceptual block diagram of an embodiment of a wireless communications system. A mobile device 102 is shown moving through a wide area cellular network 104 by a series of broken lines. The cellular network 104 includes a BSC 106 supporting a number of BTSs dispersed throughout the cellular coverage region. A single BTS 108 is shown in FIG. 1A for simplicity of explanation. A mobile switching center (MSC) 110 may be used to provide a gateway to a public switched telephone network (PSTN) 112. Although not shown in FIG. 1A, the cellular network 104 may employ numerous BSCs each supporting any number of BTSs to extend the geographic reach of the cellular network 104. When multiple BSCs are employed throughout the cellular network 104, the MSC 110 may also be used to coordinate communications between the BSCs.

One or more wireless LANs may be dispersed throughout the cellular coverage region of the cellular network 104. A single wireless LAN 114 is shown in FIG. 1A as an example of any of a variety of packet-switched networks that may communicate with the mobile device 102. The wireless LAN 114 may be an IEEE 802.11 network, or any other suitable network. The wireless LAN 114 includes an access point 116 for the mobile device 102 to communicate with an IP network 118. A server 120 may be used to interface the IP network 118 to the MSC 110, which provides a gateway to the PSTN 112. The server 120 may be one or more separate systems providing various functions as described in more detail in FIG. 2. Additionally, FIG. 1A does not illustrate all the possible communication pathways between the different systems and networks.

When power is initially applied to the mobile device 102, it will attempt to access either the cellular network 104 or the wireless LAN 114. The decision to access a particular network may depend on a variety of factors relating to the specific application and overall design constraints. By way of example, the mobile device 102 may be configured to access the wireless LAN 114 when the service quality meets a minimum threshold. To the extent the wireless LAN 114 can be used to support mobile telephony and data communications, valuable cellular bandwidth may be freed up for other mobile users.

The mobile device 102 may be configured to continuously search for a beacon from the access point 116, or any other access point of a wireless LAN. The beacon is a periodic signal transmitted by the access point 116 with synchronization information. In the event that the mobile device 102 cannot detect a beacon, which might be the case if power is applied to the mobile device 102 at location A, then the mobile device 102 attempts to access the cellular network 104. The mobile device 102 may access the cellular network 104 by acquiring a pilot signal from the BTS 108. Once the pilot signal is acquired, a radio connection may be established between the mobile device 102 and the BTS 108 by means well known in the art. The mobile device 102 may use the radio connection with the BTS 108 to register with the MSC 110. Registration is the process by which the mobile device 102 makes its whereabouts known to the cellular network 104. When the registration process is complete, the mobile device 102 may enter into an idle state until a call is initiated, either by the mobile device 102 or the PSTN 112. Either way, an air traffic link may be established between the mobile device 102 and the BTS 108 to set up and support the call.

When the mobile device 102 moves through the cellular network 104 from location A to location B in the depicted embodiment, it is now able to detect a beacon from the access point 116. Once this occurs, a radio connection may be established between the two by means well known in the art. The mobile device 102 then obtains the IP address of the server 120. The mobile device 102 may use the services of a Domain Name Server (DNS) to determine the server's IP address. The domain name of the server 120 may be delivered to the mobile device 102 over the cellular network 104. With the IP address, the mobile device 102 can establish a network connection with the server 120.

Figure 1B:
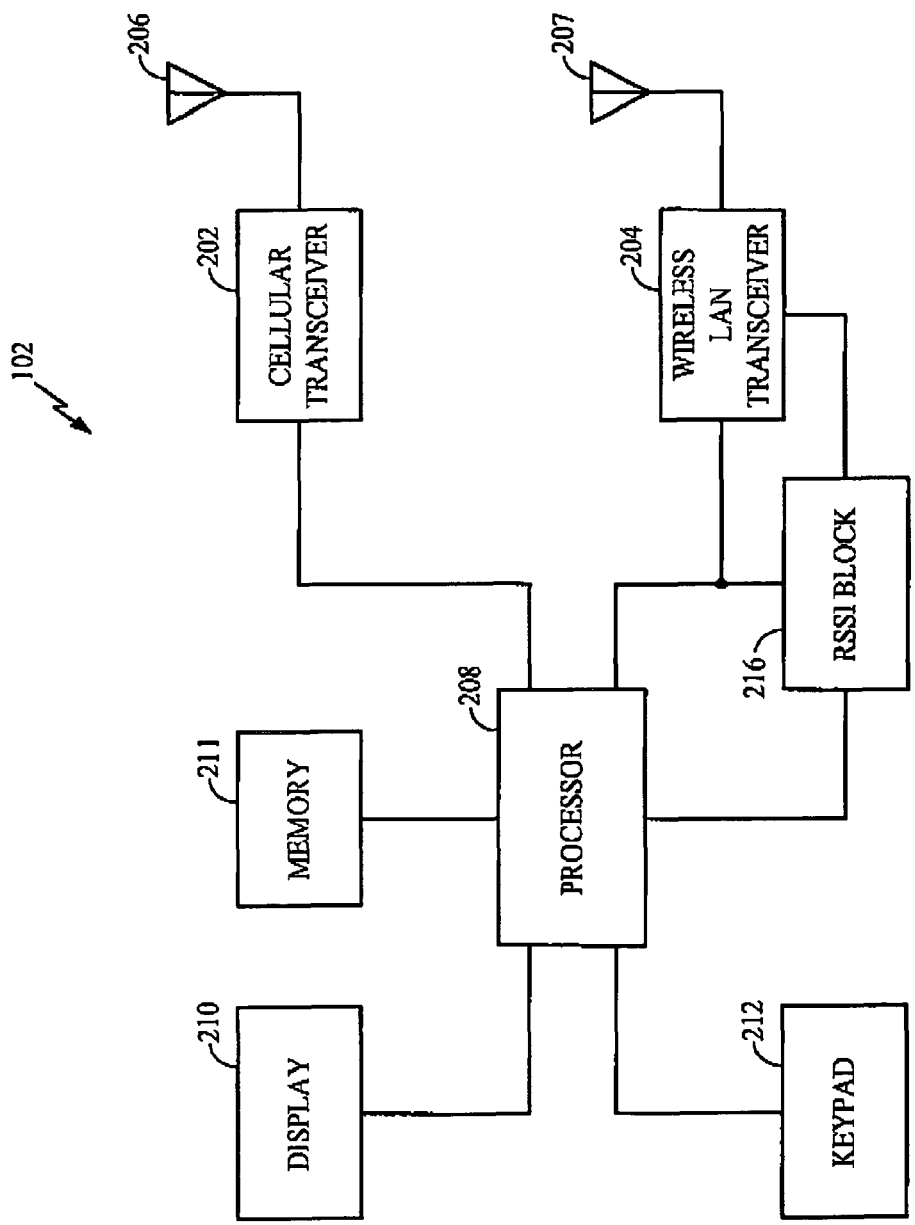
FIG. 1B is a functional block diagram illustrating an example of a mobile device capable of supporting both circuit switched cellular and wireless LAN communications.

FIG. 1B is a functional block diagram illustrating an example of a mobile device capable of supporting both circuit switched cellular and wireless LAN communications. The mobile device 102 may include a cellular transceiver 202 and a wireless LAN transceiver 204. In at least one embodiment of the mobile device 102, the cellular transceiver 202 is capable of supporting CDMA2000 1x communications with a BTS (not shown), and the wireless LAN transceiver 204 is capable of supporting IEEE 802.11 communications with an access point (not shown). Those skilled in the art will readily appreciate, however, that the concepts described in connection with the mobile device 102 can be extended to other cellular and wireless LAN technologies. Each transceiver 202, 204 is shown with a separate antenna 206, 207, respectively, but the transceivers 202, 204 could share a single broadband antenna. Each antenna 206, 207 may be implemented with one or more radiating elements.

The mobile device 102 is also shown with a processor 208 coupled to both transceivers 202, 204, however, a separate processor may be used for each transceiver in alternative embodiments of the mobile device 102. The processor 208 may be implemented as hardware, firmware, software, or any combination thereof. By way of example, the processor 208 may include a microprocessor (not shown). The microprocessor may be used to support software applications that, among other things, (1) control and manage access to the cellular network and wireless LAN, and (2) interface the processor 208 to the keypad 210, display, 212, and other user interfaces (not shown). The processor 208 may also include a digital signal processor (DSP) (not shown) with an embedded software layer that supports various signal processing functions, such as convolutional encoding, cyclic redundancy check (CRC) functions, modulation, and spread-spectrum processing. The DSP may also perform vocoder functions to support telephony applications. The manner in which the processor 208 is implemented will depend on the particular application and the design constraints imposed on the overall system. Those skilled in the art will recognize the interchangeability of hardware, firmware, and software configurations under these circumstances, and how best to implement the described functionality for each particular application.

For certain purposes known in the art, the signal strength from the access point may be measured at the mobile device 102 with a received signal strength indicator (RSSI) block 216. The RSSI is most likely an existing signal that is fed back to the wireless LAN transceiver 202 for automatic gain control, and therefore, can be provided to the processor 208 without increasing the circuit complexity of the mobile device 102. Alternatively, the quality of the radio connection may be determined from the beacon.

The processor 208 may be configured to execute an algorithm to detect when handoff conditions exist and to initiate appropriate signaling with other connected systems. The algorithm may be implemented as one or more software applications supported by the microprocessor based architecture discussed earlier and stored in the accessible memory 211. Alternatively, the algorithm may be a module separate from the processor 208. The module may be implemented in hardware, software, firmware, or any combination thereof. Depending on the specific design constraints, the algorithm could be integrated into any entity in the mobile device 102, or distributed across multiple entities in the mobile device 102.

Figure 2:
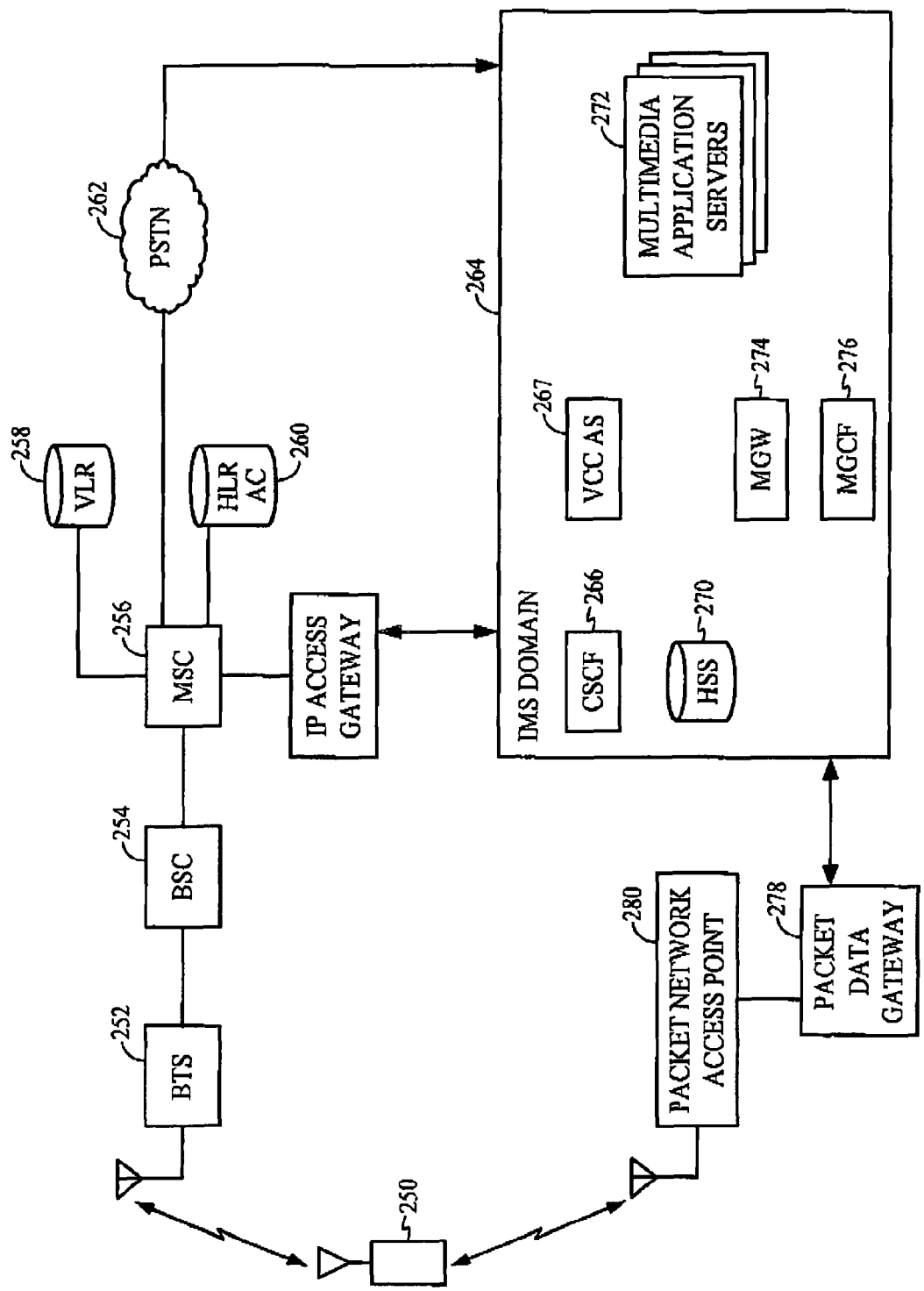
FIG. 2 depicts a conceptual block diagram of the network gateway system of FIG. 1A.

To facilitate voice communications between a packet network and a circuit-switched network, such as the PSTN 112, the resources of the system 120 are utilized. Details of some functions or components of the system 120 are shown in more detail in FIG. 2. The system 120 of FIG. 1A is more comprehensively described as an IP Multimedia Subsystem (IMS) domain 264 as depicted in FIG. 2. The IMS domain has a number of different systems providing the following functions, for example: servers providing IP based services such as SIP servers and SIP registrars (known as Call Session Control Function, CSCF) 266, servers providing interworking with legacy PSTN networks such as MGCF 276 and MGW 274, servers providing interworking with CS cellular networks such as VCC AS. Also, a plurality of multimedia Application servers 272 can be included that provide different services to the mobile device 250. The specific servers identified in FIG. 2 are exemplary in nature and fewer or more servers can be included without departing from the scope of the present invention. In general, one function of the IMS domain 264 is that of mapping signaling and voice communications between the packet-switched network and a circuit-switched network to thereby permit communications between the two. The IMS domain 264 may, for example, provide a SIP based network connection for a mobile device 250. The Session Initiation Protocol (SIP) is a signaling protocol used for establishing sessions in an IP network. A session could be a simple two-way telephone call or it could be a collaborative multi-media conference session. The ability to establish these sessions means that a host of innovative services become possible, such as voice-enriched e-commerce, web page click-to-dial, Instant Messaging with buddy lists, and IP Centrex services. Some other aspects illustrated by FIG. 2 is the inclusion of the HSS server 270 which is the home subscriber server and serves the same function as the HLR in legacy circuit switched networks; and the connection between the PSTN 262 and the IMS domain 264. In the FIG. 2 also shown is a path between BSC (254) and IP Access Gateway.

The other cellular network elements in FIG. 2 have been described previously such as the BTS 252, the BSC 254, the MSC 256, the VLR 258, the HLR/AC 260 and the PSTN 262. The mobile device 250 can access both the cellular network and a packet switched network, such as a wireless LAN, using the packet data gateway 278 and a packet network access point 280.

In particular, the IMS domain may include a media gateway 274 that converts transmissions between a packet stream from the IP network and the voice circuit-switched network such as the PSTN 262. Thus, voice is carried in packets over the packet-switched network and the media gateway 274, while voice is carried over voice encoded communication circuits in a circuit-switched connection between the media gateway 274 and the PSTN 262. A media gateway control function (MGCF) 276 is also provided that operates to terminate SIP signaling and control functions of the media gateway 274. In this regard, the MGCF 276 typically performs conversion between SIP signaling in the IP session and SS7 signaling in the circuit-switched session.

A voice call continuity application server (VCC AS) 267 is also provided that anchors certain communication sessions. The VCC AS is part of a service that a network operator may provide to its subscribers. This service may be automatically included as a service or be a subscription service which a user must select and possibly pay additional fees for its capabilities. Original designs of a multimode network such as that in FIG. 1A envisioned that each time a mobile device initiated a circuit-switched call, then (if they are a subscriber to the VCC service) that call session would be anchored at the VCC AS upon call initiation. Anchoring involves the VCC AS storing sufficient information to restore or handoff a session if it becomes necessary. Typically such information includes the identity of the two parties participating in the session, the services being utilized during the session, and any transport specific information that is useful in defining the state of the network and the call during the session. Such a design automatically anchors all calls upon initiation regardless of whether that call ever actually requires handoff. Accordingly, resources of the VCC AS 267 are used for calls that do not require its functionality. Additionally, the procedure of anchoring the call adds a delay to the setup of the circuit-switched session which may be noticeable to a user.

The details of FIG. 2 are depicted as functional blocks and may be physically implemented in a variety of different ways. Each functional block may be one or more separate computer-based platforms for executing appropriate software or they may be logical functions of an application executing on the same computer-based platform.

Figure 3:
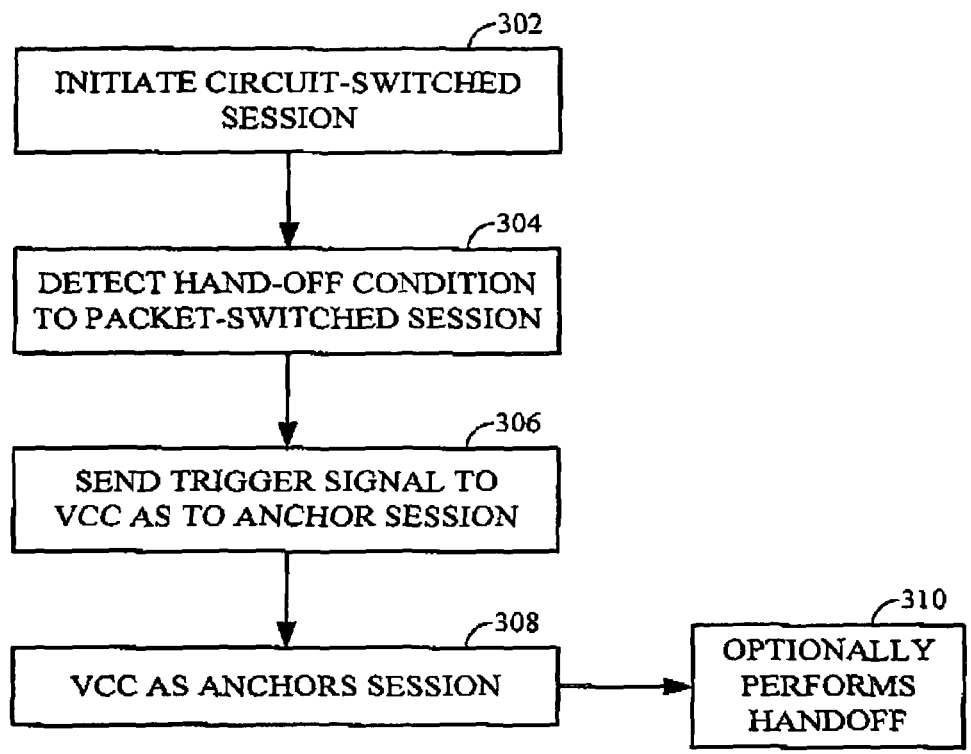
FIG. 3 depicts a flowchart of an exemplary method of dynamic anchoring sessions in accordance with the principles of the present invention.

FIG. 3 depicts a flowchart of an exemplary method for anchoring sessions that varies significantly from the conventional static anchoring design just described. In accordance with the method of FIG. 3, anchoring occurs on a dynamic basis when needed. As a result, system resources of the VCC AS 267 are used more efficiently and call setup times can be reduced. In step 302, a user of a mobile device initiates a circuit-switched session such as a conventional voice telephone call. During this session, however, the mobile device may detect, in step 304, that a handoff condition exists. A handoff condition occurs when the mobile device determines that a packet-switched access network is available for handling the current session. More particularly, during an ongoing circuit-switched session, the mobile device may determine that it has entered the coverage area of a packet-switched network and that this network would be suited for handling the current circuit-switched session. One of ordinary skill will recognize that there are many functionally equivalent ways for the handset to determine when it is appropriate to transfer from the accessing the circuit-switched network to accessing the packet-switched network.

Regardless of the method for determining a handoff condition exists, when such a condition is detected, the handset sends a trigger signal, in step 306, to the VCC AS informing it that the handoff condition exists. In response to receiving the trigger signal, the VCC AS takes the steps necessary to anchor, in step 308, the session to optionally allow handoff from the circuit-switched session to a packet-switched session, in step 310. Thus, utilizing the method of FIG. 3, only those sessions that are soon to be handed-off are actually anchored. If a session never experiences a handoff condition, then no trigger signal is sent form the mobile device and, therefore, that session is not anchored. As compared to the static anchoring of every call when it is initiated, this dynamic anchoring of sessions reduces delay time when the call is setup and more efficiently utilizes the resources of the VCC AS.

The sequence of FIGS. 4A-4D depicts one exemplary sequence of performing such a handoff. Some of the figures depict only some of the components useful for implementing such a handoff and anchoring. However, functions such as the media gateway and the media gateway control function are not explicitly shown in all the figures so as not to obscure certain aspects of the present invention. However, in certain embodiments these functions are included to perform the appropriate signaling and data transformations to facilitate sessions involving packet-switched networks and circuit-switched networks.

Figure 4A:
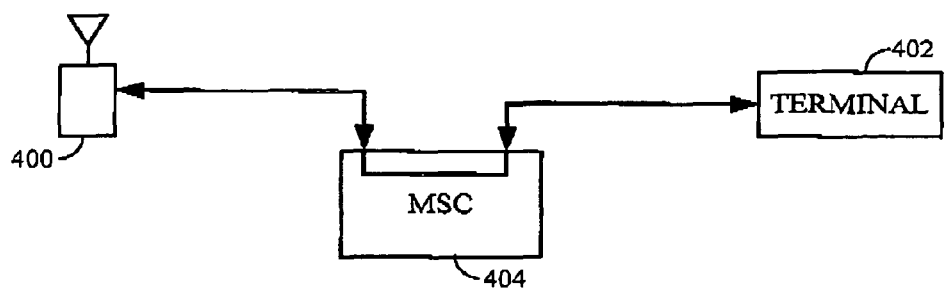
FIGS. 4A-4D depict the sequence of steps of one exemplary method for handing off a circuit-switched session to a packet-switched network.
Figure 4B:
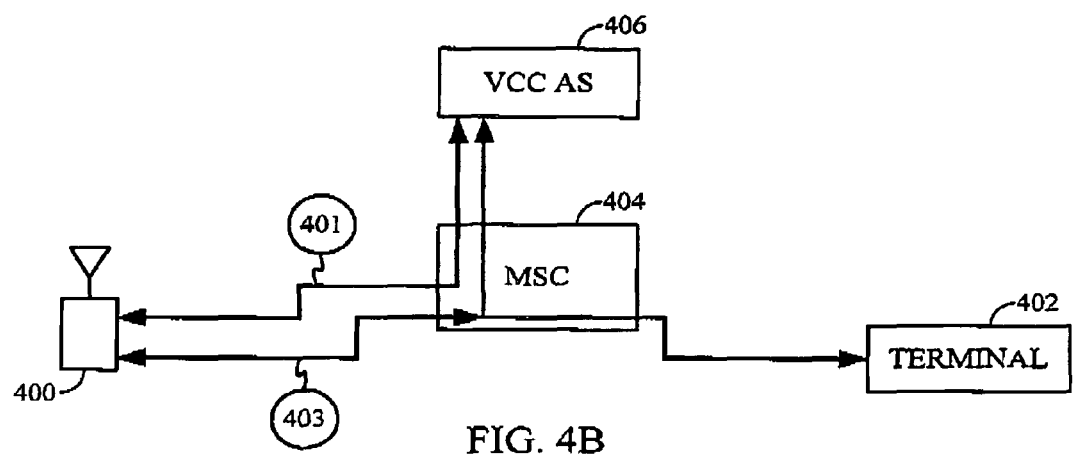

In FIG. 4A, one mobile device 400 has initiated a circuit-switched session with another terminal 402 through the use of the MSC 404. The terminal 402 may, for example, be a mobile device or a conventional telephone and the entire session relies on circuit-switched networks. When a handoff condition is detected at the mobile device 400 it sends a trigger signal to the VCC AS 406 to anchor the session. The VCC AS 406 and the mobile device 400 initiate the communication pathways depicted in FIG. 4B and begin the handoff process. In particular, the mobile device places (path 401) a new circuit-switched call to the VCC AS 406 and transfers (path 403) the ongoing circuit-switched call with the terminal 402 to the VCC AS 406. Accordingly, at this stage, in addition to the existing circuit switched call between the terminal 400 and the terminal 402, a new circuit switched call between the terminal 400 and the VCC AS 406 is established.

Figure 4C:
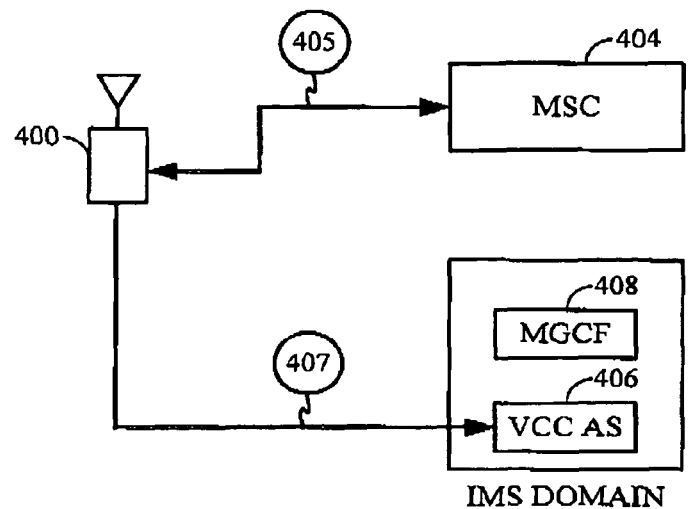
Figure 4D:
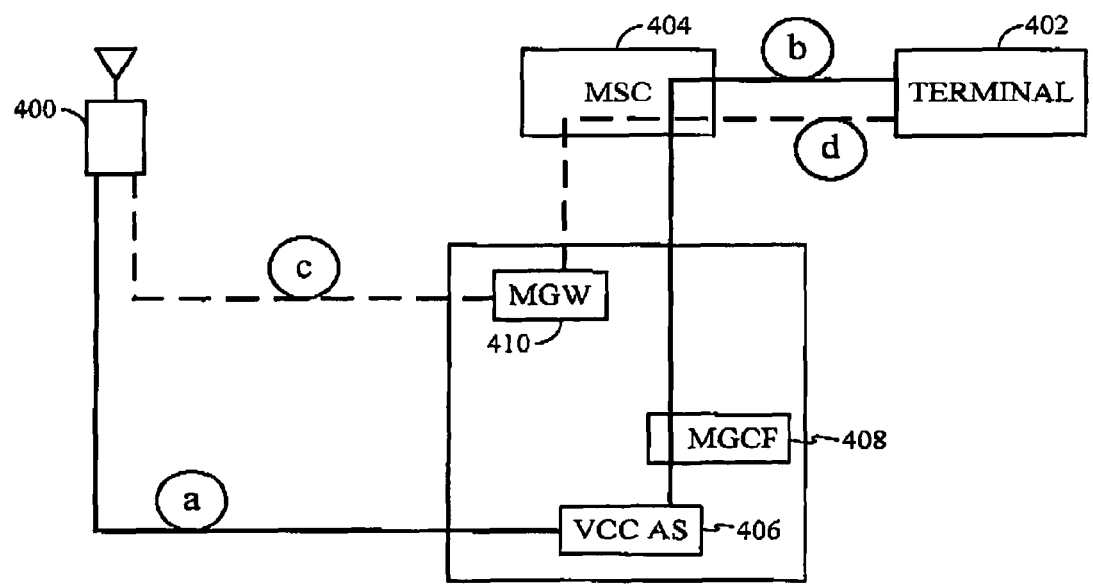

FIG. 4C depicts the next step in which the mobile device 400 initiates a session (path 407) with the VCC AS 406 via the packet-switched access network. The VCC AS recognizes the incoming call as the handover request and completes the handoff. As part of the call transfer procedure, the circuit switched call path between the terminal 400 and the MSC 404 is released. FIG. 4D depicts the final state in which there is (a) a signaling path between the mobile device 400 and the VCC AS 406, (b) a signaling path between the terminal 402 and the VCC AS 406 that utilizes the MSC 404 and the MGCF 408., (c) a media path between the mobile device 400 and the media gateway 410, and (d) a media path between the terminal 404 and the media gateway 410 utilizing the MSC 404. Accordingly, the mobile device 400 has completed a handoff from a circuit-switched session to a packet-switched session without the other terminal 402 being aware of the transfer. In addition, the circuit switched network elements such as MSC are unaware of the handover of the circuit switched session.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The various illustrative logical blocks, modules, circuits, elements, and/or components described in connection with the embodiments disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but is to be accorded the full scope consistent with the language claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for providing call continuity in a mobile communications device configured to communicate over multiple access networks, comprising:

determining, during an active circuit-switched session, a handoff condition to a packet-switched network exists;

in response, sending a signal to initiate anchoring to a server configured to anchor the active circuit-switched session, wherein the server is a voice call continuity application server (VCC AS);

establishing, during the active circuit-switched session, a new circuit-switched session between the mobile communications device and the server anchoring the active circuit-switched session; and transferring a mobile communications device-side media path of the active circuit-switched session to route through the new circuit-switched session at the VCC AS prior to a hand-off of the mobile communications device-side media path of the active circuit-switched session to the packet-switched network.

2. The method of claim 1, further comprising:
sending transfer signals to the server to complete the hand-off of the mobile communications device-side media path of the active circuit-switched session to the packet-switched network.

3. The method of claim 1, wherein the packet-switched network is an Internet Protocol (IP) network.

4. The method of claim 1, wherein Session Initiation Protocol (SIP) is used to communicate between the mobile communications device and the server.

5. The method of claim 1, wherein the signal informs the server that the mobile communications device has determined the handoff conditions exist.

6. The method of claim 1, further comprising:
transferring the active circuit-switched session to be between the server and the recipient, the recipient being a terminating point of that session other than the mobile communications device.

7. The method of claim 1, further comprising:
establishing a signaling path between the server and the mobile communications device.

8. The method of claim 1, further comprising:
establishing a signaling path between the server and the mobile communications device; and
establishing a data path between the mobile communications device and a media gateway over the packet-switched network.

9. The method of claim 1, wherein the packet-switched network includes a wireless LAN.

10. The method of claim 1, wherein the packet-switched network includes a packet-switched cellular network.

11. The method of claim 1, wherein the circuit-switched network includes a 3G cellular network.

12. A mobile communications device configured to communicate over multiple access networks, comprising:
a receiver circuit configured to receive data from multiple access networks;
a processor configured to execute instructions to:
determine, during an active circuit-switched session, a handoff condition to a packet-switched network exists;
in response, send a signal related to anchoring to a server configured to anchor active the circuit-switched session, wherein the server is a voice call continuity application server (VCC AS);
establish, during the active circuit-switched session, a new circuit-switched session between the mobile communications device and the server, wherein the active circuit-switched session is anchored at the server; and
transfer a mobile communications device-side media path of the active circuit-switched session to route through the new circuit-switched session at the VCC AS prior to a hand-off of the mobile communications device-side media path of the active circuit-switched session to the packet-switched network.

13. The device of claim 12, wherein the processor is further configured to execute instructions to send transfer signals to the server to complete the hand-off of the mobile communications device-side media path of the active circuit-switched session to the packet-switched network.

14. The device of claim 12, wherein the packet-switched network is an Internet Protocol (IP) network.

15. The device of claim 12, wherein Session Initiation Protocol (SIP) is used to communicate between the mobile communications device and the server.

16. The device of claim 12, wherein the signal informs the server that the mobile communications device has determined the handoff condition rules.

17. The device of claim 12, wherein the processor is further configured to execute instructions to:
transfer the active circuit-switched session to be between the server and recipient, the recipient being a terminating point of that session other than the mobile communications device.

18. The device of claim 12, wherein the processor is further configured to execute instructions to:
establish a signaling path between the server and the mobile communications device.

19. The device of claim 12, wherein the processor is further configured to execute instructions to:
establish a signaling path between the server and the mobile communications device; and
establish a data path between the mobile communications device and a media gateway over the packet-switched network.

20. The device of claim 12, wherein the packet-switched network includes a wireless LAN.

21. The device of claim 12, wherein the circuit-switched network includes a packet-switched cellular network.

22. The device of claim 12, wherein the circuit-switched network includes a 3G cellular network.

23. A non-transitory computer readable media encoded with programming instructions for providing call continuity in a mobile communications device configured to communicate over multiple access networks, that upon execution thereof, cause one or more processors of a mobile communications device to perform the steps of:
determining during an active circuit-switched session, a handoff condition to a packet-switched network exists;
in response, sending a signal related to anchoring to a server configured to anchor the active circuit-switched session, wherein the server is a voice call continuity application server (VCC AS);
establishing, during the active circuit-switched session, a new circuit-switched session between the mobile communications device and the server, wherein the active circuit-switched session is anchored at the server; and
transferring a mobile communications device-side media path of the active circuit-switched session to route through the new circuit-switched session at the VCC AS prior to a hand-off of the mobile communications device-side media path of the active circuit-switched session to the packet-switched network.

24. A mobile communications device configured to communicate over multiple access networks, comprising:
means for determining a handoff condition to a packet-switched network exists during an active circuit-switched session;

means for sending a signal to initiate anchoring at a server configured to anchor the circuit-switched session in response, wherein the server is a voice call continuity application server (VCC AS);

means for establishing, during the active circuit-switched session, a new circuit-switched session between the mobile communications device and the server, wherein the active circuit-switched session is anchored at the server; and means for transferring a mobile communications device-side media path of the active circuit-switched session to route through the new circuit-switched session at the VCC AS prior to a hand-off of the mobile communications device-side media path of the active circuit-switched session to the packet-switched network.

25. The device of claim 24, further comprising:

means for sending transfer signals to the server to complete the hand-off of the mobile communications device-side media path of the active circuit-switched session to the packet-switched network.

26. The device of claim 24, wherein the packet-switched network is an Internet Protocol (IP) network.

27. The device of claim 24, wherein Session Initiation Protocol (SIP) is used to communicate between the mobile communications device and the server.

28. The device of claim 24, wherein the signal informs the server that the mobile communications device has determined the handoff condition exists.

29. The device of claim 24, further comprising:

means for establishing a new circuit-switched session between the mobile communications device and the server; and means for transferring the active circuit-switched session to be between the server and recipient, the recipient being a terminating point of that session other than the mobile communications device.

30. The device of claim 24, further comprising:

means for establishing a signaling path between the server and the mobile communications device.

31. The device of claim 24, further comprising:

means for establishing a signaling path between the server and the mobile communications device; and means for establishing a data path between the mobile communications device and a media gateway over the packet-switched network.

32. The device of claim 24, wherein the packet-switched network includes a wireless LAN.

33. The device of claim 24, wherein the packet-switched network includes a packet-switched cellular network.

34. The device of claim 24, wherein the circuit-switched network includes a 3G cellular network.

* * * * *